(12) United States Patent
McLennan et al.

(10) Patent No.: US 10,047,873 B2
(45) Date of Patent: Aug. 14, 2018

(54) COVER ASSEMBLY FOR AN AUTOMATIC FLUSHOMETER

(71) Applicant: Masco Canada Limited, St. Thomas (CA)

(72) Inventors: Paul McLennan, London (CA); Frank Stauder, London (CA)

(73) Assignee: Masco Canada Limited, St. Thomas, Ontario ( * ) Notice: Subject to any disclaimer, the term of this patent is extended or adjusted under 35 U.S.C. 154(b) by 0 days.

(21) Appl. No.: 15/402,568

(22) Filed: Jan. 10, 2017

(65) Prior Publication Data

US 2018/0195633 A1 Jul. 12, 2018

(51) Int. Cl.
*E03D 11/00* (2006.01)
*F16K 27/12* (2006.01)

(52) U.S. Cl.
CPC .............. *F16K 27/12* (2013.01); *E03D 11/00* (2013.01)

(58) Field of Classification Search
CPC ........ F16K 27/12; E03D 11/00; F16L 37/244; F16L 37/248; F16L 37/252
USPC ................................. 137/385; 251/366, 367
See application file for complete search history.

(56) References Cited

U.S. PATENT DOCUMENTS

| | | | | |
|---|---|---|---|---|
| 2,377,740 A | * | 6/1945 | Alford | F04D 29/023 415/201 |
| 3,917,218 A | * | 11/1975 | Marocco | F16K 31/404 251/30.03 |
| 4,793,588 A | | 12/1988 | Laverty, Jr. | |
| 4,878,695 A | * | 11/1989 | Whitham | F16L 37/252 285/292.1 |
| 5,169,118 A | | 12/1992 | Whiteside | |
| 5,170,912 A | * | 12/1992 | Du | B67D 1/105 222/129.2 |
| 5,548,119 A | | 8/1996 | Nortier | |
| 5,927,313 A | | 7/1999 | Hart | |
| 6,019,343 A | * | 2/2000 | Tsai | E03D 3/06 251/129.03 |

(Continued)

FOREIGN PATENT DOCUMENTS

| | | | | |
|---|---|---|---|---|
| JP | 10-168978 A | * | 6/1998 | |
| WO | WO 2015119566 A1 | * | 8/2015 | .............. A01J 5/12 |

OTHER PUBLICATIONS

English language abstract of Japanese Pub. No. 10-168978.

*Primary Examiner* — Michael R Reid
*Assistant Examiner* — Jonathan Waddy
(74) *Attorney, Agent, or Firm* — Reising Ehtington, P.C.

(57) ABSTRACT

A cover assembly for an automatic flushometer includes a locking ring configured for coupling to a flush valve body and configured to be disposed about a rotational axis. The locking ring defines a recess in a radially outer perimeter. A cover defines an opening at one end and a cavity configured to receive a solenoid of the flushometer. The cover has a projection extending radially inwardly from a radially inner surface of the cover. The projection defines a circumferential groove. The projection is configured to allow movement of the cover relative to the locking ring along the rotational axis when aligned with the recess in the locking ring. The groove is configured to receive a portion of the locking ring circumferentially adjacent to the recess upon rotation of the cover about the rotational axis thereby preventing movement of the cover relative to the locking ring along the rotational axis.

19 Claims, 4 Drawing Sheets

(56) References Cited

U.S. PATENT DOCUMENTS

| | | | |
|---|---|---|---|
| 6,349,921 B1 | 2/2002 | Jahrling | |
| 7,156,363 B2 | 1/2007 | Parsons et al. | |
| 7,294,161 B2 * | 11/2007 | Connor | B01D 46/0005 210/DIG. 17 |
| 7,367,541 B2 * | 5/2008 | Muderlak | E03D 3/02 251/129.04 |
| 7,926,510 B1 * | 4/2011 | Terry, III | E03F 11/00 137/363 |
| 8,021,465 B2 | 9/2011 | Hilberer | |
| 8,070,128 B2 | 12/2011 | Snyder et al. | |
| 2006/0124885 A1 | 6/2006 | Irizar Igarzabal | |
| 2008/0078969 A1 * | 4/2008 | Snyder | E03D 3/02 251/129.03 |
| 2010/0252759 A1 * | 10/2010 | Guler | E03D 3/06 251/129.04 |
| 2014/0224338 A1 | 8/2014 | Maercovich | |
| 2015/0160060 A1 * | 6/2015 | Christie | G01F 15/14 73/273 |
| 2017/0000075 A1 * | 1/2017 | Johansson | A01J 5/12 |

\* cited by examiner

COVER ASSEMBLY FOR AN AUTOMATIC FLUSHOMETER

BACKGROUND a. Field

This disclosure relates generally to a cover assembly for an automatic flushometer. More specifically, this disclosure pertains to a cover assembly that is relatively easy to install and provides improved protection of the flushometer from foreign objects and elements.

b. Background Art

Flushometers are used to control delivery of fluid to a toilet bowl or urinal from a fluid supply line. Flushometers rely on fluid pressure in the fluid supply line as opposed to gravity when a fluid tank is drained into a bowl and are typically used in commercial or public restrooms. Automatic flushometers (also referred to as hands-free or touchless flushometers) typically employ a sensor to identify whether or not a person or other object is present. The sensor generates a signal that is used by the flushometer to determine when to flush the toilet. The sensor and other electronic components of an automatic flushometer are typically enclosed within a housing to prevent damage to the components from vandalism, fluids and various foreign objects and elements. Conventional housings, however, are often difficult to install and must be installed in such a way that the housing fails to adequately protect the flushometer or creates additional leak paths.

The inventors herein have recognized a need for a cover assembly for an automatic flushometer that will overcome one or more of the above-identified deficiencies.

BRIEF SUMMARY

A cover assembly for an automatic flushometer is provided. In particular, a cover assembly is provided that is easier to install as compared to conventional flushometer housings and provides improved protection for the flushometer from foreign objects and elements.

A cover assembly for an automatic flushometer in accordance with one embodiment includes a locking ring configured for coupling to a flush valve body and configured to be disposed about a rotational axis. The locking ring defines a recess in a radially outer perimeter. The assembly further includes a cover defining an opening at one end and a cavity configured to receive a solenoid of the automatic flushometer. The cover has a projection extending radially inwardly from a radially inner surface of the cover and the projection defines a circumferential groove formed therein. The projection is configured to allow movement of the cover relative to the locking ring along the rotational axis when aligned with the recess in the locking ring. The circumferential groove is configured to receive a portion of the locking ring circumferentially adjacent to the recess upon subsequent rotation of the cover about the rotational axis to thereby prevent movement of the cover relative to the locking ring along the rotational axis.

A cover assembly for an automatic flushometer in accordance with another embodiment includes a locking ring configured for coupling to a flush valve body and configured to be disposed about a rotational axis. The locking ring defines a recess in a radially outer perimeter. The assembly further includes a cover defining an opening at one end and a cavity configured to receive a solenoid of the automatic flushometer. The cover has a projection extending radially inwardly from a radially inner surface of the cover and the projection defines a circumferential groove formed therein. The projection is configured to allow movement of the cover relative to the locking ring along the rotational axis when aligned with the recess in the locking ring. The circumferential groove is configured to receive a portion of the locking ring circumferentially adjacent to the recess upon subsequent rotation of the cover about the rotational axis to thereby prevent movement of the cover relative to the locking ring along the rotational axis. The assembly further includes a set screw configured to extend through an aperture in a side wall of the cover and engage the locking ring to prevent movement of the cover about the rotational axis after the portion of the locking ring is received within the circumferential groove.

The foregoing and other aspects, features, details, utilities, and advantages of the disclosed embodiments will be apparent from reading the following description and claims, and from reviewing the accompanying drawings.

DETAILED DESCRIPTION

Figure 1:
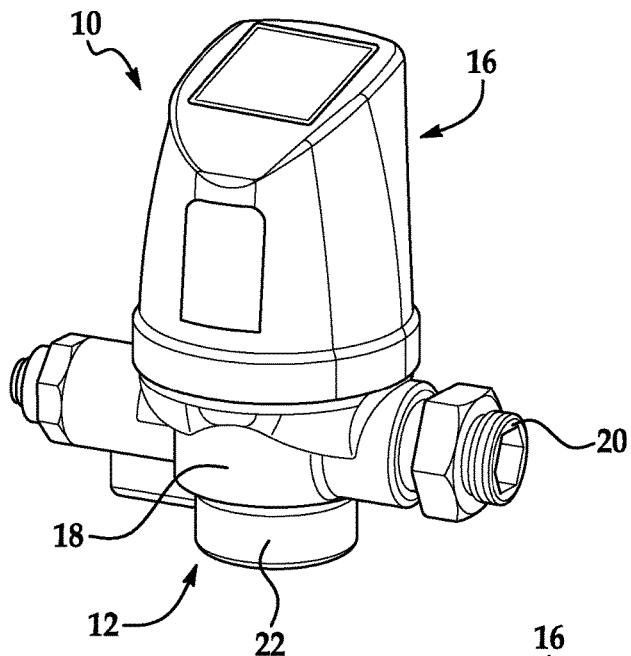
FIG. 1 is a perspective view of an automatic flushometer assembly including one embodiment of a cover assembly for the flushometer.
Figure 2:
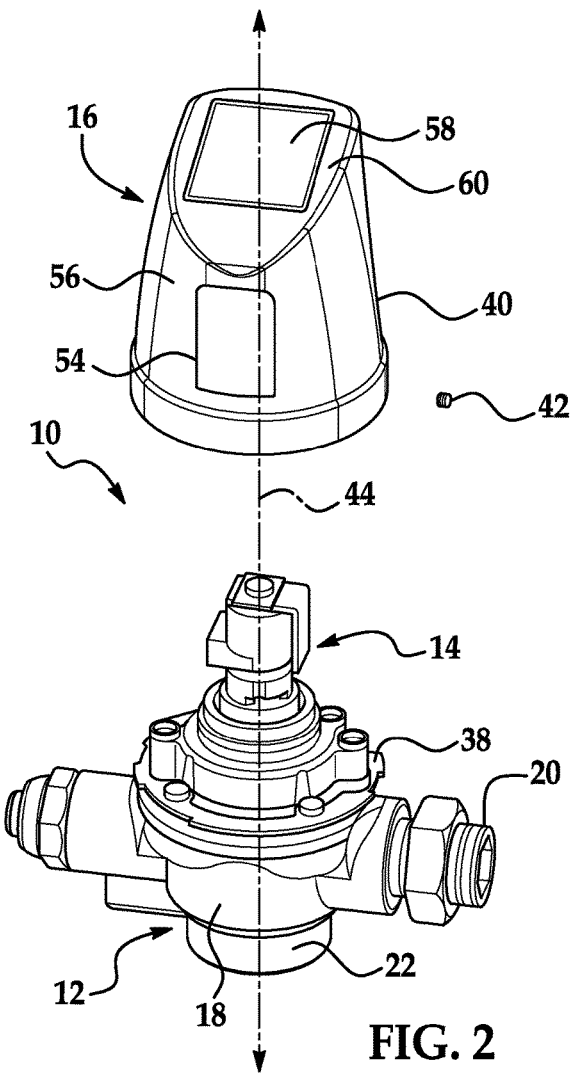
FIG. 2 is a an exploded view of the assembly of FIG. 1 illustrating the components of the cover assembly.
Figure 3:
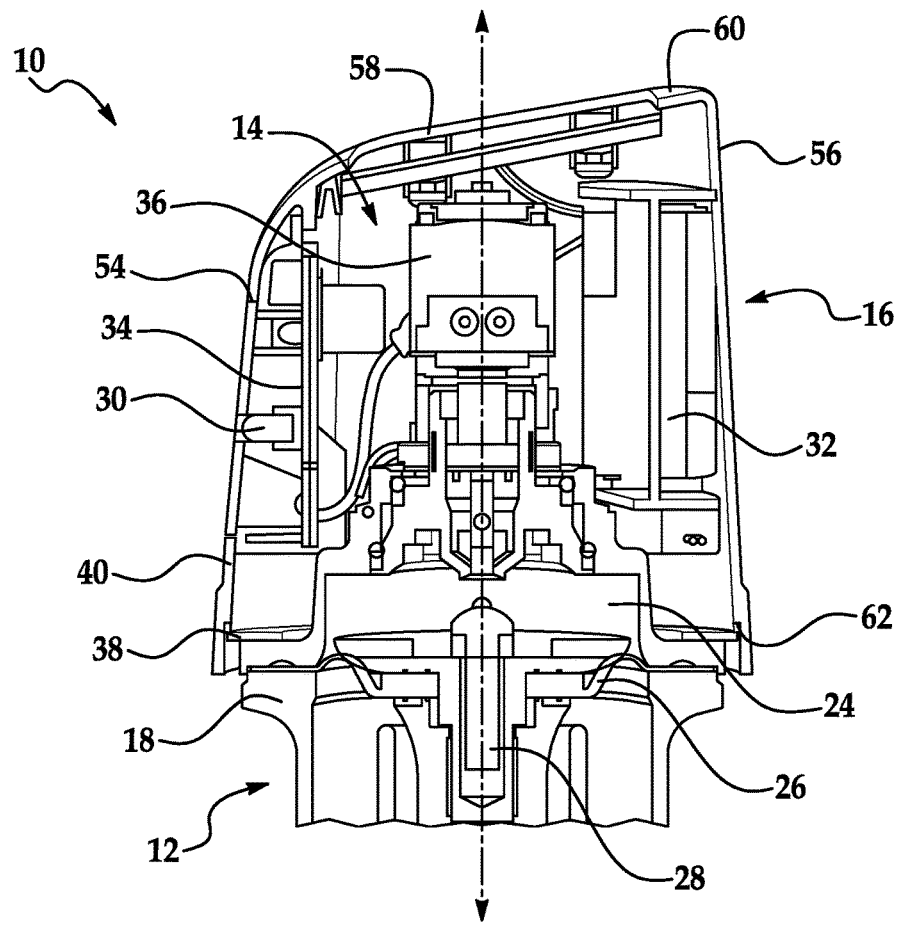
FIG. 3 is a cross-sectional view of the assembly of FIG. 1.

Referring now to the drawings wherein like reference numerals are used to identify identical components in the various views, FIGS. 1-3 illustrate an automatic flushometer assembly 10. Assembly 10 is used to control delivery of water or other fluids from a fluid supply line (not shown) to a sanitary fixture such as a toilet or urinal and, in particular, to the bowl of the toilet or urinal. In the illustrated embodiment, assembly 10 includes a flush valve assembly 12, a solenoid cap assembly 14 and one embodiment of a cover assembly 16 for the flushometer assembly 10.

Flush valve assembly 12 controls delivery of water from the fluid supply line to the sanitary fixture. Referring to FIGS. 1-2, assembly 12 includes a valve body 18 that defines connections 20, 22 to the fluid supply line and fixture. Referring to FIG. 3, body 18 also defines a fluid chamber 24. A valve element such as a diaphragm 26 is disposed within valve body 18 and is normally seated so as to prevent fluid flow from either the fluid chamber 24 and/or the fluid supply line to the fixture. The valve element includes a non-hold open pin 28 or another structure coupled to diaphragm 26 that is displaced by solenoid cap assembly 14 to temporarily unseat diaphragm 26. When diaphragm 26 is unseated, fluid flows from chamber 24 and the fluid supply line to the fixture. Diaphragm 26 then returns to its seat to prevent further fluid flow to the fixture. Once diaphragm 26 is seated, fluid flows from the fluid supply line through a bleed orifice to refill fluid chamber 24. Although a particular structure for flush valve assembly 12 is shown in the illustrated embodiment, it should be understood that flush valve assembly 12 may be configured in a variety of ways.

Solenoid cap assembly 14 controls the state of flush valve assembly 12 and, in particular, the position of diaphragm 26 within valve body 18. Assembly 14 is mounted on valve body 18 of flush valve assembly 12 and may include a sensor 30, power source 32, a controller 34, and a solenoid 36. Although a particular structure for assembly 14 is shown in the illustrated embodiment, it should again be understood that assembly 14 may be configured in a variety of ways.

Sensor 30 detects the presence of an object (e.g., a person) within a defined area outside of and proximate to cover assembly 16. Sensor 30 may include a light emitter such as light emitting diode and a light detector such as a photodiode and may be configured to emit and detect infrared light. The light detector detects infrared light reflected by the presence of an object in the path of the emitted light and converts the light into electrical charge thereby producing a signal indicative of the presence of the object. In alternate embodiments, sensor 30 may comprise a proximity/capacitance sensor.

Power source 32 provides current to electronic components such as sensor 30, controller 34 and solenoid 36. Power source 32 may comprise a battery or a capacitor that is disposed within cover assembly 16. Power source 32 may be recharged as discussed hereinbelow.

Controller 34 is provided to control movement of solenoid 36 in response to signals generated by sensor 30. Controller 34 may comprise a programmable microprocessor or an application specific integrated circuit (ASIC). Controller 34 may include a central processing unit (CPU) and an input/output (I/O) interface through which controller 34 may receive of input signals including signals generated by sensor 30 and generate output signals including those used to control solenoid 36. Sensor 30 and controller 34 may be integrated into a single electronic component.

Solenoid 36 is provided to control the position of pin 28 in flush valve assembly 12. Actuation of solenoid 36 is controlled by controller 34 responsive to signals generated by sensor 30. Sensor 30 generates signals indicative of the presence of an object and the subsequent departure/absence of the object. Upon departure of the object, sensor 30 generates a signal and provides that signal to controller 36. In response, controller 36 outputs a signal that causes solenoid 36 to move pin 28 and unseat diaphragm 26 to open flush valve assembly 12 and allow fluid flow to the fixture.

Cover assembly 16 is provided to protect the components of solenoid cap assembly 14 from foreign objects and elements and provide an aesthetically pleasing appearance to a user. Cover assembly 16 may also provide support for one or more components of assembly 14 and position and orient components of assembly 14. Assembly 16 may include a locking ring 38, a cover 40 and one or more set screws 42.

Figure 4:
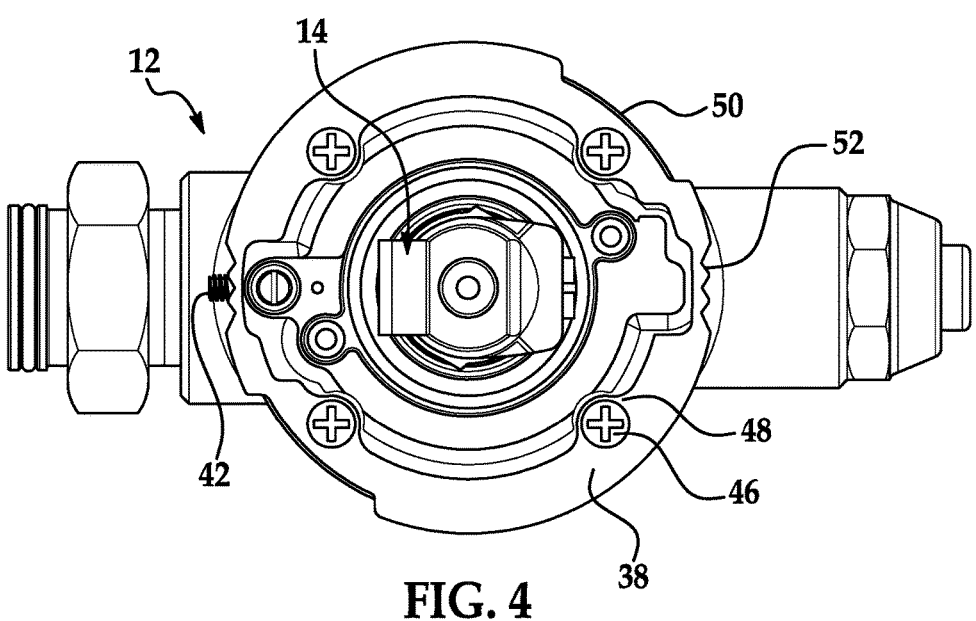
FIG. 4 is a plan view of a portion of the assembly of FIG. 1 illustrating a locking ring of the cover assembly affixed to a flush valve of the flushometer assembly.

Referring to FIG. 4, locking ring 38 is provided to secure cover assembly 16 to flush valve assembly 12. Ring 38 may be fabricated from prefabricated stainless steel, brass, aluminum or carbon steel sheets using a waterjet, plasma, wire electrical discharge machining (EDM) or laser cutting process as opposed being formed through stamping or similar processes and may therefore be made without relatively expensive tooling. Ring 38 is annular in shape and is configured to be disposed about, and may be centered about, a rotational axis 44 (best shown in FIGS. 2-3) of cover 40. Ring 38 is configured for coupling to valve body 18. In particular, ring 38 may define a plurality of axially extending apertures (four in the illustrated embodiment) configured for alignment with corresponding apertures in valve body 18 and configured to receive fasteners 46 extending through the apertures in ring 38 and into valve body 18 to secure ring 38 against movement along and/or about axis 44. The fastener apertures in ring 38 may be equally circumferentially spaced about axis 44 and may be disposed nearer to a radially inner perimeter of ring 38 than a radially outer perimeter of ring 38. In the illustrated embodiment, ring 38 defines a plurality of radially inwardly extending lands 48 through which the fastener apertures extend. Locking ring 38 further defines one or more recesses 50 formed in a radially outer perimeter of ring 38 for a purpose described below. In the illustrated embodiment, ring 38 defines two recesses 50 that are diametrically opposite one another. Locking ring 38 further defines a plurality of formations 52 in the radially outer perimeter of ring 38 configured to engage set screws 42. In the illustrated embodiment, ring 38 includes two sets of formations 52 diametrically opposite one another on ring 38. Formations 52 have a shape that is complementary to the shape of the end of set screws 42 in order to inhibit relative rotation of ring 38 and set screws 42. In the illustrated embodiment, formations 52 have a generally triangular shape and define triangular recesses between adjacent formations 52 that are configured to receive conically shaped ends of set screws 42. Formations 52 are circumferentially spaced from recesses 50 along the radially outer perimeter of ring 38.

Referring again to FIGS. 1-3, cover 40 is provided to enclose solenoid cap assembly 14 in order to prevent damage to components of assembly 14 from external objects and elements. Cover 40 may be made from metals such as zinc and metal alloys as well as plastics. Cover 40 is generally cylindrical in shape and defines a cavity configured to receive components of assembly 14 including solenoid 36. Cover 40 may also be configured to support one or more components of assembly 14 such as sensor 30 and power source 32 as cover 40 is installed over the other components of assembly 14 and onto locking ring 38. Cover 40 is closed at one end, but defines an opening at an opposite end to allow cover 40 to be installed over assembly 14. Cover 40 defines a window 54 in a side wall 56 that is configured for alignment with sensor 30 upon assembly in order to allow transmission and reception of infrared light by sensor 30. Cover 40 may also include a light energy collection device 58 such as a solar cell in an end wall 60 of cover 40. Device 58 is configured to transform light energy into electrical energy that can be used to charge power source 32. Conductors may extend from device 58 to power source 32.

Figure 5:
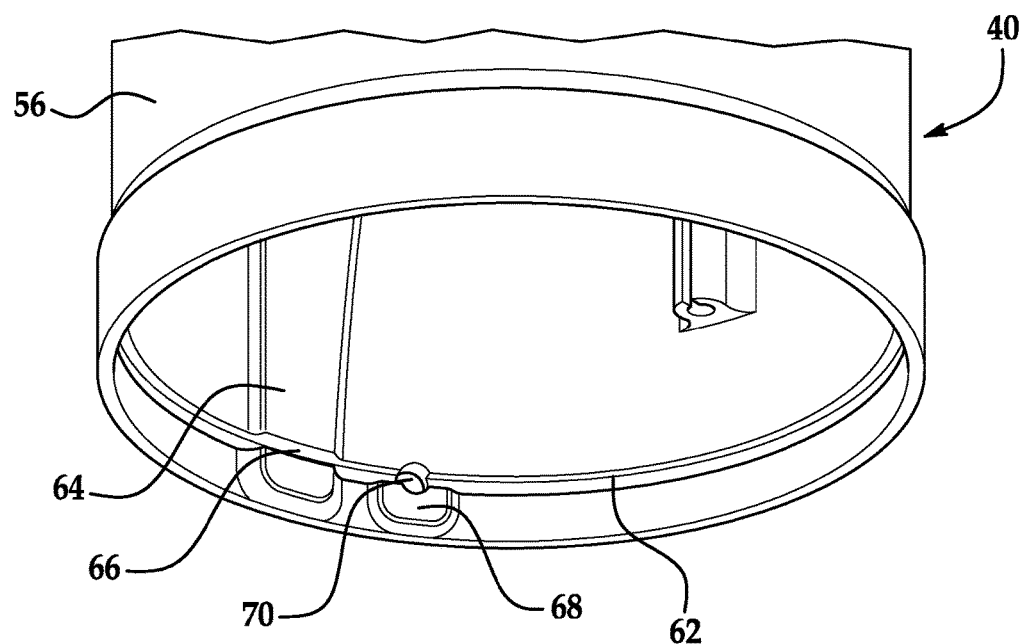
FIGS. 5 and 6 are perspective views of portions of the cover of the cover assembly for the flushometer assembly of FIG. 1.
Figure 6:
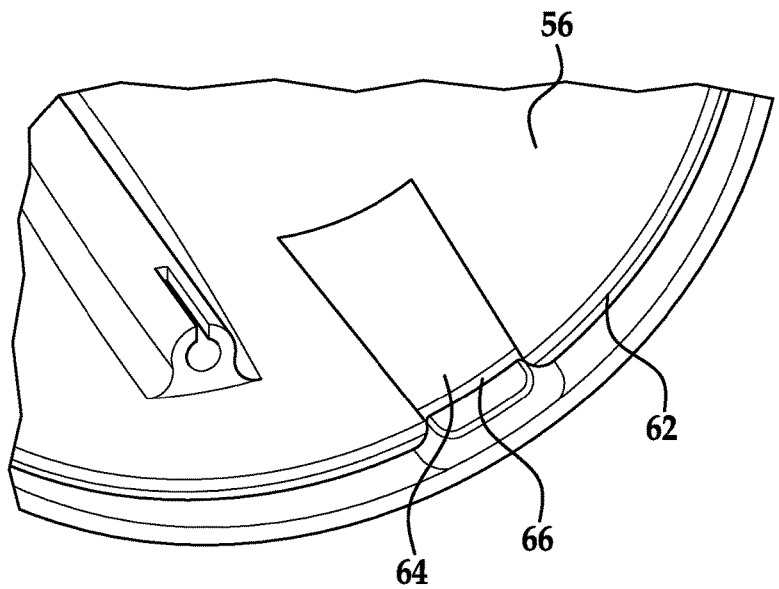

Referring now to FIGS. 5-6, the radially inner surface of cover 40—and particularly side wall 56—is configured to position cover 40 relative to locking ring 38 to both enclose assembly 14 and inhibit removal of cover 40. The diameter of the radially inner surface of side wall 56 may vary to define a shoulder 62 proximate the open end of cover 40. Referring to FIG. 3, shoulder 62 is configured to engage a radially outer portion of locking ring 38 to position cover 40 relative to ring 38 and limit movement of cover 40 along axis 44 in one axial direction (downward in FIG. 3). Shoulder 62 may extend about the entire circumference of the radially inner surface of cover 40 and engages a side of locking ring 38 opposite valve body 18. Referring again to FIGS. 5-6, cover 40 may define one or more projections 64 extending radially inwardly from the radially inner surface of cover 40. Projections 64 are configured to allow movement of cover 40 relative to locking ring 38 along axis 44 when projections 64 are aligned with recesses 50 in locking ring 38. Each projection 64 defines a circumferential groove 66 extending from one circumferential end of projection 64 to an opposite circumferential end of projection 64. Groove 66 is configured to receive a portion of locking ring 38 circumferentially adjacent recess 50 in locking ring 38 once cover 40 is rotated about axis 44 as described below and one side wall of groove 66 may comprise a portion of shoulder 62. In the illustrated embodiment, cover 40 defines two projections 64 that are diametrically opposite one another. It should be understood, however, that the number and spacing of projections 64 may vary. Cover 40 may further define one or more projections 68 extending radially inwardly from the radially inner surface of cover 40. Projections 68 may be configured to support set screws 42 following insertion of set screws 42 through apertures 70 in side wall 56 of cover 40. Projection 68 may define a surface facing shoulder 62 that is relatively flat on either side of a semicircular recess configured to support set screw 42. The recess may be threaded. Projections 68 are circumferentially spaced from projections 64. The circumferential distance from one circumferential end of projection 64 through the adjacent circumferential ends of projections 64, 68 to the other circumferential end of projection 68 is less than the circumferential distance of recess 50 in locking ring 38 for reasons set forth below.

Set screws 42 lock cover 40 into place on locking ring 38 after cover 40 is installed. Screws 42 are configured to extend through apertures 70 in side wall 56 of cover 40 and engage formations 52 in locking ring 38. As noted above, the end of each screw 42 engaging ring 38 may have a shape that is complementary to the formations 52 in ring 38. Referring to FIG. 4, in the illustrated embodiment the end of screw 42 is conical in shape and configured to be received within triangular recesses formed between formations 52. Referring again to FIG. 5, screws 42 may be supported on projections 68 in cover 40 after insertion through apertures 70. In the illustrated embodiment, a single set screw 42 is shown. It should be understood, however, that additional set screws may be used to better secure cover 40 to ring 38. It should also be understood that set screws 42 could alternatively be made to engage a portion of flush valve body 12 or flushometer 14 as opposed to locking ring 38. As an alternative to the use of set screws 42, ring 38 could be fabricated with one or more radially outwardly extending deformable fingers that are biased to a first, radially outer position. As cover 40 is installed over ring 38 and shoulder 62 is brought into engagement with ring 38, the inner surface of cover 40 may force the fingers to a second, radially inner position. Upon rotation of cover 40, and alignment of apertures 70 with the fingers, the fingers will spring through apertures 70 to secure cover 40 against rotation.

Figure 7:
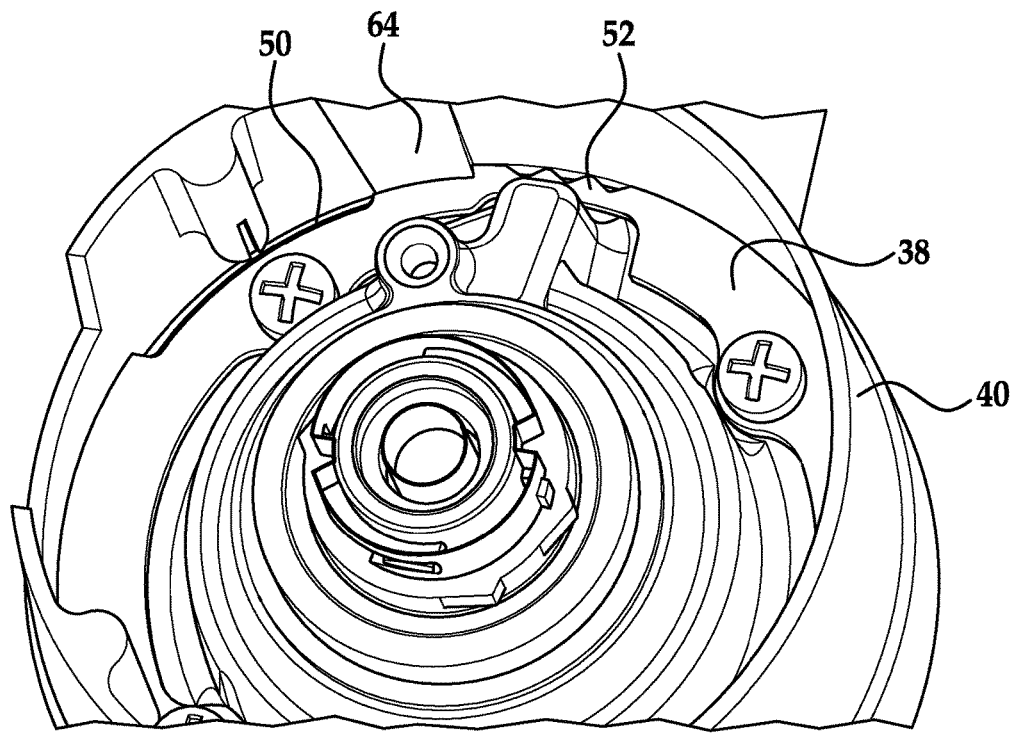
FIGS. 7 and 8 are perspective and cross-sectional views of portions of the flushometer assembly of FIG. 1 after installation of the cover assembly.
Figure 8:
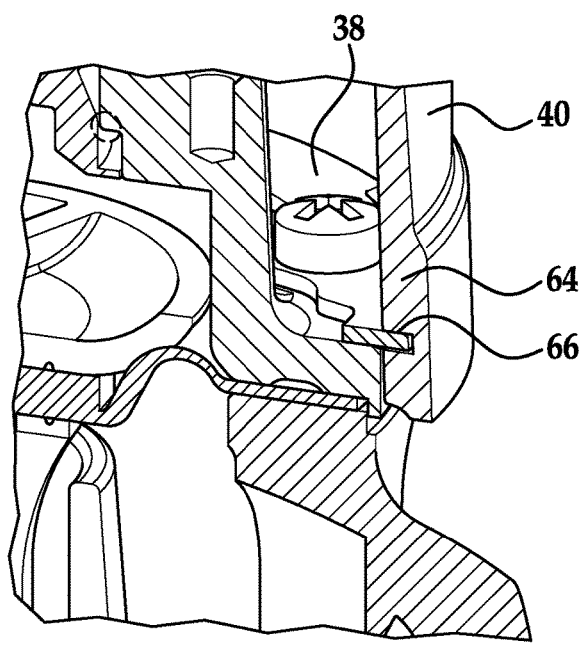

Referring again to FIG. 4, a method for covering components of solenoid cap assembly 14 of flushometer assembly 10 may begin with the step of affixing locking ring 38 to valve body 18. The step may include several substeps including rotating ring 38 about axis 44 until the apertures in ring 38 are aligned with corresponding apertures in valve body 18 and inserting fasteners 46 through the apertures to couple ring 38 to valve body 18. Referring to FIG. 2, the method may continue with the step of installing cover 40 over assembly 14. This step may include the substep of rotating cover 40 about axis 44 until projections 64 (and projections 68 if present) are aligned with recesses 50 in locking ring 38. The step may further include the substep of moving cover 40, after alignment of projections 64 with recesses 50, along axis 44 until shoulder 62 in cover 40 engages locking ring 38 as shown in FIG. 3. Once shoulder 62 engages locking ring 38, the method may continue with the step of rotating cover 40 about axis 44 such that portions of locking ring 38 circumferentially adjacent recesses 50 are received within grooves 66 in projections 64 as shown in FIGS. 7-8. This action prevents further movement of cover 40 along axis 44 in either axial direction unless and until cover 40 is rotated in the opposite direction to realign projections 64 in cover 40 with recesses 50 in locking ring 38. Rotation of cover 40 also aligns aperture 70 in cover 40 with formations 52 in locking ring 38. As a result, the method may further include the step of inserting set screw 42 through aperture 70 and into engagement with formations 52 in locking ring 38. This action prevents rotation of cover 40 about axis 44 unless and until set screws 42 are removed.

A cover assembly 16 for an automatic flushometer 10 in accordance with the present teachings is advantageous relative to conventional cover assemblies because it is easier to install as compared to conventional flushometer housings and provides improved protection for components of flushometer 10 from foreign objects and elements. The cover assembly 16 can be installed on the flush valve assembly 12 with relatively simple movements that facilitate both right hand and left hand installation as well as rapid maintenance of flushometer assembly 10. Further, cover assembly 16 can be easily retrofitted to existing flush valve bodies 18 without modifying installed flushometers and with minimal disassembly. Further still, the mechanics of assembling cover assembly 16 to flush valve assembly 12 permit relatively large tolerances that facilitate ease of assembly and manufacture. Despite the relative ease of installation, cover assembly 16 is securely fastened to flush valve assembly 12 to prevent removal or other acts of vandalism. Further, because cover 40 of cover assembly 16 does not require any vertical openings for fasteners, the risk of fluid contamination through cover assembly 16 is reduced, the available area for energy collection through light energy collection device 58 on cover 40 is maximized, and design flexibility for aesthetics is increased. Cover assembly 16 also permits angular adjustment of cover 40 (to the degree permitted by the circumferential length of recesses 50 and formations 52 on ring 38 and projections 64 on cover 40) to allow for adjustment of the position and orientation of sensor 30 to account for potential signal reflection or interference from nearby objects and incorrect installation of valve body 18. Adjustment of sensor 30 in a vertical direction can be accomplished through the use of shims between ring 38 and flush valve body 18 at one or more locations about axis 44.

While the invention has been shown and described with reference to one or more particular embodiments thereof, it will be understood by those of skill in the art that various changes and modifications can be made without departing from the spirit and scope of the invention.

We claim:

1. An automatic flushometer cover assembly for an automatic flushometer, comprising:

a locking ring configured for coupling to a flush valve body and configured to be disposed about a rotational axis, the locking ring defining a first recess in a radially outer perimeter; and, an automatic flushometer assembly cover defining an opening at one end and a cavity configured to receive a solenoid of the automatic flushometer, the cover having a first projection extending radially inwardly from a radially inner surface of the cover and the first projection defining a circumferential groove formed therein, wherein the cover defines a window in a side wall of the cover aligned with a sensor of the flushometer, wherein the first projection is configured to allow movement of the cover relative to the locking ring along the rotational axis when aligned with the first recess in the locking ring and the circumferential groove is configured to receive a portion of the locking ring circumferentially adjacent to the first recess upon subsequent rotation of the cover about the rotational axis to thereby prevent movement of the cover relative to the locking ring along the rotational axis.

2. The automatic flushometer cover assembly of claim 1 wherein the locking ring defines a second recess in the radially outer perimeter and the cover defines a second projection extending radially inwardly from the radially inner surface of the cover and the second projection defines a circumferential groove formed therein, the second projection configured to allow movement of the cover relative to the locking ring along the rotational axis when aligned with the second recess in the locking ring and the circumferential groove in the second projection is configured to receive a portion of the locking ring circumferentially adjacent to the second recess upon subsequent rotation of the cover about the rotational axis to thereby prevent movement of the cover relative to the locking ring along the rotational axis.

3. The automatic flushometer cover assembly of claim 2 wherein the first and second recesses are diametrically opposite one another on the locking ring and the first and second projections are diametrically opposite one another on the cover.

4. The automatic flushometer cover assembly of claim 1 wherein the locking ring defines a second recess in the radially outer perimeter, the first projection configured to allow movement of the cover relative to the locking ring along the rotational axis when aligned with either of the first and second recesses in the locking ring and the circumferential groove in the first projection is configured to receive a portion of the locking ring circumferentially adjacent to a corresponding one of the first and second recesses upon subsequent rotation of the cover about the rotational axis to thereby prevent movement of the cover relative to the locking ring along the rotational axis.

5. The automatic flushometer cover assembly of claim 1 wherein the locking ring includes an aperture extending therethrough, the aperture configured for alignment with a corresponding aperture in the flush valve body and configured to receive a fastener coupling the locking ring to the flush valve body.

6. The cover assembly of claim 1 wherein the cover is adjustable with a set screw configured to extend through an aperture in the side wall of the cover and engage a plurality of formations in the radially outer perimeter of the locking ring.

7. The automatic flushometer cover assembly of claim 1 wherein the cover defines a light energy collection device in an end wall of the cover opposite the opening.

8. The automatic flushometer cover assembly of claim 1 wherein the radially inner surface of the cover defines a shoulder configured to engage a side of the locking ring opposite the flush valve body, the shoulder formed in a portion of the radially inner surface on a first side of the first projection.

9. The automatic flushometer cover assembly of claim 8 wherein the shoulder forms one side of the circumferential groove in the first projection.

10. An automatic flushometer cover assembly for an automatic flushometer, comprising:
a locking ring configured for coupling to a flush valve body and configured to be disposed about a rotational axis, the locking ring defining a first recess in a radially outer perimeter and defining a plurality of formations in the radially outer perimeter;
an automatic flushometer assembly cover defining an opening at one end and a cavity configured to receive a solenoid of the automatic flushometer, the cover having a first projection extending radially inwardly from a radially inner surface of the cover and the first projection defining a circumferential groove formed therein, wherein the cover defines a window in a side wall of the cover aligned with a sensor of the flushometer, and wherein the first projection is configured to allow movement of the cover relative to the locking ring along the rotational axis when aligned with the first recess in the locking ring and the circumferential groove is configured to receive a portion of the locking ring circumferentially adjacent to the first recess upon subsequent rotation of the cover about the rotational axis to thereby prevent movement of the cover relative to the locking ring along the rotational axis; and,
a set screw configured to extend through an aperture in the side wall of the cover and engage the plurality of formations in the radially outer perimeter of the locking ring to prevent movement of the cover about the rotational axis after the portion of the locking ring is received within the circumferential groove.

11. The automatic flushometer cover assembly of claim 10 wherein the plurality of formations in the radially outer perimeter of the locking ring have a shape complementary to the shape of an end of the set screw.

12. The automatic flushometer cover assembly of claim 10 wherein the locking ring defines a second recess in the radially outer perimeter and the cover defines a second projection extending radially inwardly from the radially inner surface of the cover and the second projection defines a circumferential groove formed therein, the second projection configured to allow movement of the cover relative to the locking ring along the rotational axis when aligned with the second recess in the locking ring and the circumferential groove in the second projection is configured to receive a portion of the locking ring circumferentially adjacent to the second recess upon subsequent rotation of the cover about the rotational axis to thereby prevent movement of the cover relative to the locking ring along the rotational axis.

13. The automatic flushometer cover assembly of claim 12 wherein the first and second recesses are diametrically opposite one another on the locking ring and the first and second projections are diametrically opposite one another on the cover.

14. The automatic flushometer cover assembly of claim 10 wherein the locking ring defines a second recess in the radially outer perimeter, the first projection configured to allow movement of the cover relative to the locking ring along the rotational axis when aligned with either of the first and second recesses in the locking ring and the circumferential groove in the first projection is configured to receive a portion of the locking ring circumferentially adjacent to a corresponding one of the first and second recesses upon subsequent rotation of the cover about the rotational axis to thereby prevent movement of the cover relative to the locking ring along the rotational axis.

15. The automatic flushometer cover assembly of claim 10 wherein the locking ring includes an aperture extending therethrough, the aperture configured for alignment with a corresponding aperture in the flush valve body and configured to receive a fastener coupling the locking ring to the flush valve body.

16. The automatic flushometer cover assembly of claim 10 wherein the cover defines a light energy collection device in an end wall of the cover opposite the opening.

17. The automatic flushometer cover assembly of claim 10 wherein the radially inner surface of the cover defines a shoulder configured to engage a side of the locking ring opposite the flush valve body, the shoulder formed in a portion of the radially inner surface on a first side of the first projection.

18. The automatic flushometer cover assembly of claim 17 wherein the shoulder forms one side of the circumferential groove in the first projection.

19. A flushometer, comprising:
   a flushometer valve body including a body fastener pattern having a plurality of body fastener passages;
   a locking ring including:
      a ring fastener pattern having a plurality of ring fastener passages configured for alignment with the body fastener passages,
      circumferentially spaced cover reliefs, and
      circumferentially spaced set screw formations;
   a plurality of fasteners that correspond to the body and ring fastener passages, and that fasten the locking ring to the valve body;
   a flushometer assembly cover having no vertical openings for fasteners and including:
      a side wall having an open bottom end,
      a window in the side wall of the cover aligned with a sensor of the flushometer,
      a radially inner surface having a variable diameter to define a shoulder proximate the open bottom end and configured to engage a radially outer portion of the locking ring to position the cover relative to the locking ring and limit movement of the cover in one axial direction, wherein the shoulder establishes a circumferentially extending groove configured to receive a portion of the locking ring,
      circumferentially spaced projections extending radially inwardly from the radially inner surface and receivable in the circumferentially spaced cover reliefs of the locking ring, and
      a set screw passage extending through the sidewall; and
   a set screw carried in the set screw passage of the cover to cooperate with the set screw formations of the locking ring.

* * * * *